United States Patent
Quan et al.

(10) Patent No.: US 10,057,912 B2
(45) Date of Patent: Aug. 21, 2018

(54) DATA SCHEDULING METHOD USING UNLICENSED SPECTRUM, APPARATUS, AND DEVICE

(71) Applicant: HUAWEI TECHNOLOGIES CO., LTD., Shenzhen (CN)

(72) Inventors: Wei Quan, Beijing (CN); Xiaodong Yang, Beijing (CN); Bingzhao Li, Beijing (CN); Zhenxing Hu, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 15/271,006

(22) Filed: Sep. 20, 2016

(65) Prior Publication Data
US 2017/0013635 A1    Jan. 12, 2017

Related U.S. Application Data

(63) Continuation of application No. PCT/CN2014/073909, filed on Mar. 21, 2014.

(51) Int. Cl.
*H04W 4/00* (2018.01)
*H04W 72/12* (2009.01)
(Continued)

(52) U.S. Cl.
CPC ........... *H04W 72/12* (2013.01); *H04L 41/08* (2013.01); *H04W 72/0446* (2013.01); *H04W 72/0453* (2013.01)

(58) Field of Classification Search
CPC .................................................... H04W 16/14
See application file for complete search history.

(56) References Cited

U.S. PATENT DOCUMENTS

2012/0307869 A1  12/2012  Charbit et al.
2013/0337821 A1  12/2013  Clegg
(Continued)

FOREIGN PATENT DOCUMENTS

| CN | 103188711 A | 7/2013 |
| CN | 103517456 A | 1/2014 |
| WO | WO2005081498 A1 | 9/2005 |

OTHER PUBLICATIONS

International Search Report dated Dec. 24, 2014 in PCT/CN2014/073909.
(Continued)

*Primary Examiner* — Shukri Abdallah Taha
(74) *Attorney, Agent, or Firm* — Oblon, McClelland, Maier & Neustadt, L.L.P.

(57) ABSTRACT

The present disclosure provides a data scheduling method using an unlicensed spectrum, an apparatus, and a device, and relates to the radio communications field. According to the method, apparatus, and device, an unlicensed spectrum resource can be effectively used, thereby meeting a bandwidth requirement of an LTE device. The method is as follows: first, an unlicensed-spectrum serving cell is configured for user equipment by using a configuration message of the unlicensed-spectrum serving cell; then, data is transmitted over the unlicensed-spectrum serving cell by using a scheduling command. Embodiments of the present disclosure are applied to data transfer over the unlicensed-spectrum serving cell.

16 Claims, 10 Drawing Sheets

(51) Int. Cl.
*H04L 12/24* (2006.01)
*H04W 72/04* (2009.01)

(56) References Cited

U.S. PATENT DOCUMENTS

| | | |
|---|---|---|
| 2014/0031054 A1 | 1/2014 | Zou et al. |
| 2015/0103782 A1* | 4/2015 | Xu .......................... H04L 5/001 370/329 |
| 2015/0148038 A1* | 5/2015 | Griot ....................... H04W 8/18 455/435.3 |
| 2015/0341962 A1 | 11/2015 | Zou et al. |

OTHER PUBLICATIONS

Extended European Search Report dated Jan. 31, 2017 in Patent Application No. 14886505.8.
3GPP TS 36.213 V12.1,0 (Mar. 2014), 3rd Generation Partnership Project; Technical Specification Group Radio Access Network; Evolved Universal Terrestrial Radio Access (E-UTRA); Physical layer procedures, (Release 12), Mar. 2014, 186 pages.
3GPP TS 36.321 V12.1.0 (Mar. 2014), 3rd Generation Partnership Project; Technical Specification Group Radio Access Network; Evolved Universal Terrestrial Radio Access (E-UTRA); Medium Access Control (MAC) protocol specification (Release 12), Mar. 2014, 57 pages.
3GPP TS 36.331 V12.1.0 (Mar. 2014), 3rd Generation Partnership Project; Technical Specification Group Radio Access Network; Evolved Universal Terrestrial Radio Access (E-UTRA); Radio Resource Control (RRC);Protocol specification (Release 12), Mar. 2014, 356 pages.
International Search Report dated Dec. 24, 2014 in International Application No. PCT/CN2014/073909.

\* cited by examiner

DATA SCHEDULING METHOD USING UNLICENSED SPECTRUM, APPARATUS, AND DEVICE

CROSS-REFERENCE TO RELATED APPLICATIONS

This application is a continuation of International Application No. PCT/CN2014/073909, filed on Mar. 21, 2014, which is hereby incorporated by reference in its entirety.

TECHNICAL FIELD

The present disclosure relates to wireless communications technologies, and in particular, to a data scheduling method using an unlicensed spectrum, an apparatus, and a device, which pertain to the field of mobile communications technologies.

BACKGROUND

According to description in the International Spectrum White Paper released by the Federal Communications Commission (FCC), there are more unlicensed spectrum resources that are not licensed by the Commission than spectrum resources licensed by the foregoing Commission. Generally, Long Term Evolution (LTE) devices are configured to use the foregoing licensed spectrum. For an increasing bandwidth requirement of LTE devices, bandwidth of the licensed spectrum resources is relatively limited, and therefore, is difficult to meet a bandwidth requirement of the LTE devices for a mobile service.

SUMMARY

The embodiments of the disclosure provides a data scheduling method using an unlicensed spectrum resource, an apparatus, and a device, which enable an LTE device to effectively use an unlicensed spectrum resource, thereby meeting a bandwidth requirement of the LTE device.

A first aspect of the embodiments of the disclosure provides a data scheduling method using an unlicensed spectrum resource, where the method includes:

sending a configuration message, where the configuration message includes configuration parameter information of at least one unlicensed-spectrum serving cell; and sending a scheduling command according to the configuration parameter information, so as to send data to or receive data from user equipment over the at least one unlicensed-spectrum serving cell, where the scheduling command is used for sending or receiving the data.

With reference to the first aspect, in a first possible implementation manner, the method further includes:

receiving or sending a data feedback message corresponding to the data.

With reference to the first aspect, in a second possible implementation manner, the configuration parameter information includes at least one type of or a combination of the following information:

a center frequency of the unlicensed-spectrum serving cell;
a bandwidth of the unlicensed-spectrum serving cell;
a cell identity of the unlicensed-spectrum serving cell;
a cell index of the unlicensed-spectrum serving cell;
a data transfer mode used by the unlicensed-spectrum serving cell;
a cross-scheduling state identifier used by the unlicensed-spectrum serving cell;
a data transfer granularity corresponding to data transfer performed in a domain or a frequency domain; and
a feedback parameter corresponding to the data.

With reference to the first aspect, in a third possible implementation manner, the sending a scheduling command includes:

when the unlicensed-spectrum serving cell is cross-scheduled, masking the scheduling command by using an unlicensed-cell radio network temporary identifier, and sending the scheduling command.

With reference to the first aspect, in a fourth possible implementation manner, the configuration message is a configuration message corresponding to a secondary serving cell of a base station.

A second aspect of the embodiments of the disclosure provides a data scheduling method using an unlicensed spectrum resource, where the method includes:

receiving a configuration message, where the configuration message includes configuration parameter information of at least one unlicensed-spectrum serving cell;

receiving a scheduling command, where the scheduling command is used for sending or receiving service data; and sending or receiving the data over the at least one unlicensed-spectrum serving cell according to the scheduling command.

With reference to the second aspect, in a first possible implementation manner, the method further includes:

receiving or sending a data feedback message corresponding to the data.

With reference to the second aspect, in a second possible implementation manner, the configuration parameter information includes at least one type of or a combination of the following information:

a center frequency of the unlicensed-spectrum serving cell;
a bandwidth of the unlicensed-spectrum serving cell;
a cell identity of the unlicensed-spectrum serving cell;
a cell index of the unlicensed-spectrum serving cell;
a data transfer mode used by the unlicensed-spectrum serving cell;
a cross-scheduling state identifier used by the unlicensed-spectrum serving cell;
a data transfer granularity corresponding to data transfer performed in a domain or a frequency domain; and
a feedback parameter corresponding to the data.

With reference to the second aspect, in a third possible implementation manner, when the unlicensed-spectrum serving cell is cross-scheduled, the scheduling command is masked by using by using an unlicensed-cell radio network temporary identifier.

With reference to the second aspect, in a fourth possible implementation manner, the configuration message is a configuration message corresponding to a secondary serving cell of a base station.

A third aspect of the embodiments of the disclosure provides an apparatus, where the apparatus includes:

a configuration unit, configured to send a configuration message, where the configuration message includes configuration parameter information of at least one unlicensed-spectrum serving cell; and a scheduling unit, configured to send a scheduling command according to the configuration parameter information sent by the configuration unit, so as to send data to or receive data from user equipment over the at least one unlicensed-spectrum serving cell, where the scheduling command is used for sending or receiving the service data.

With reference to the third aspect, in a first possible implementation manner, the apparatus further includes:

a feedback unit, configured to receive or send a data feedback message corresponding to the data after the data is sent or received by using the scheduling unit.

With reference to the third aspect, in a second possible implementation manner, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

With reference to the third aspect, in a third possible implementation manner, the sending a scheduling command includes:

when the unlicensed-spectrum serving cell is cross-scheduled, masking the scheduling command by using an unlicensed-cell radio network temporary identifier, and sending the scheduling command.

With reference to the third aspect, in a fourth possible implementation manner, the configuration message is a configuration message corresponding to a secondary serving cell of a base station.

A fourth aspect of the embodiments of the disclosure provides an apparatus, where the apparatus includes:

a configuring unit, configured to receive a configuration message, where the configuration message includes configuration parameter information of at least one unlicensed-spectrum serving cell;

a scheduling unit, configured to receive a scheduling command, where the scheduling command is used for sending or receiving data; and a transmission unit, configured to send or receive the data over the at least one unlicensed-spectrum serving cell according to the scheduling command received by the scheduling unit.

With reference to the fourth aspect, in a first possible implementation manner, the apparatus further includes:

a feedback unit, configured to receive or send a data feedback message corresponding to the data after the data is sent or received by the transmission unit.

With reference to the fourth aspect, in a second possible implementation manner, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

With reference to the fourth aspect, in a third possible implementation manner, when the unlicensed-spectrum serving cell is cross-scheduled, the scheduling command is masked by using an unlicensed-cell radio network temporary identifier.

With reference to the fourth aspect, in a fourth possible implementation manner, the configuration message is a configuration message corresponding to a secondary serving cell of a base station.

A fifth aspect of the embodiments of the disclosure provides a device, where the device includes:

a transmitter, a receiver, a bus, a memory, and a processor, where the memory is configured to store an instruction, and the processor reads the instruction to:

send a configuration message by using the transmitter, where the configuration message includes configuration parameter information of at least one unlicensed-spectrum serving cell; and send a scheduling command by using the transmitter according to the configuration parameter information sent by the transmitter, so as to send data to or receive data from user equipment over the at least one unlicensed-spectrum serving cell, where the scheduling command is used for sending or receiving the data.

With reference to the fifth aspect, in a first possible implementation manner, the processor reads the instruction to further:

receive, by using the receiver, or send, by using the transmitter, a data feedback message corresponding to the data.

With reference to the fifth aspect, in a second possible implementation manner, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

With reference to the fifth aspect, in a third possible implementation manner, the sending a scheduling command includes:

when the unlicensed-spectrum serving cell is cross-scheduled, masking the scheduling command by using an unlicensed-cell radio network temporary identifier, and sending the scheduling command.

With reference to the fifth aspect, in a fourth possible implementation manner, the configuration message is a configuration message corresponding to a secondary serving cell of a base station.

A sixth aspect of the embodiments of the disclosure provides a device, where the device includes a transmitter, a receiver, a bus, a memory, and a processor, where the memory is used to store an instruction, and the processor reads the instruction to:

receive a configuration message by using the receiver, where the configuration message includes configuration parameter information of at least one unlicensed-spectrum serving cell;

receive a scheduling command by using the receiver, where the scheduling command is used for sending or receiving data; and send, by using the transmitter, or receive, by using the receiver, the data over the at least one unlicensed-spectrum serving cell according to the scheduling command received by the receiver.

With reference to the sixth aspect, in a first possible implementation manner, the processor reads the instruction to further:

receive, by using the receiver, or send, by using the transmitter, a data feedback message corresponding to the data.

With reference to the sixth aspect, in a second possible implementation manner, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a domain or a frequency domain; and a feedback parameter corresponding to the data.

With reference to the sixth aspect, in a third possible implementation manner, when the unlicensed-spectrum serving cell is cross-scheduled, the scheduling command is masked by using an unlicensed-cell radio network temporary identifier.

With reference to the sixth aspect, in a third possible implementation manner, the configuration message is a configuration message corresponding to a secondary serving cell of a base station.

The embodiments of the disclosure provides a data scheduling method using an unlicensed spectrum resource, an apparatus, and a device. First, an unlicensed-spectrum serving cell is configured for user equipment by using a configuration message of the unlicensed-spectrum serving cell; then, data is transmitted over the unlicensed-spectrum serving cell by using a scheduling command. In this way, an unlicensed spectrum resource can be effectively used, thereby meeting a bandwidth requirement of an LTE device.

DESCRIPTION OF EMBODIMENTS

Figure 1:
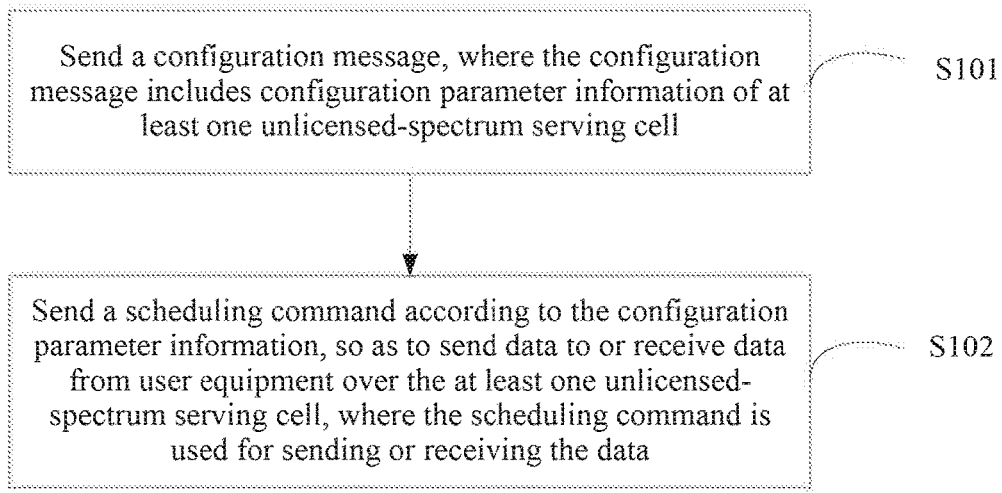
FIG. 1 is a schematic flowchart of a data scheduling method using an unlicensed spectrum resource according to an embodiment of the present disclosure.

An embodiment of the present disclosure provides a data scheduling method using an unlicensed spectrum resource, such spectrums that are designated as unlicensed by the Federal Communications Commission (FCC). As shown in FIG. 1, the method includes:

S101. Send a configuration message, where the configuration message includes configuration parameter information of at least one unlicensed-spectrum serving cell.

S102. Send a scheduling command according to the configuration parameter information, so as to send data to or receive data from user equipment over the at least one unlicensed-spectrum serving cell, where the scheduling command is used for sending or receiving the data.

According to the data scheduling method using an unlicensed spectrum resource provided in this embodiment of the present disclosure, first, an unlicensed-spectrum serving cell is configured for a user by sending configuration information; then, a scheduling command is sent, so that data is transmitted over the unlicensed-spectrum serving cell. In this way, an unlicensed spectrum resource can be effectively used, thereby meeting a bandwidth requirement of an LTE device.

Figure 2:
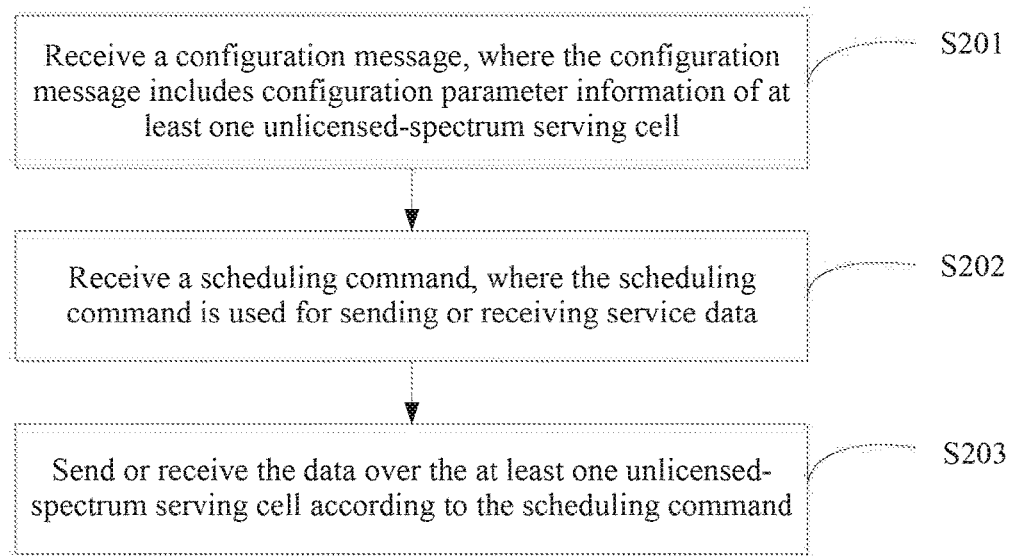
FIG. 2 is another schematic flowchart of a data scheduling method using an unlicensed spectrum resource according to an embodiment of the present disclosure.

An embodiment of the present disclosure provides a data scheduling method using an unlicensed spectrum resource. As shown in FIG. 2, the method includes:

S201. Receive a configuration message, where the configuration message includes configuration parameter information of at least one unlicensed-spectrum serving cell.

S202. Receive a scheduling command, where the scheduling command is used for sending or receiving service data.

S203. Send or receive the data over the at least one unlicensed-spectrum serving cell according to the scheduling command.

According to the data scheduling method using an unlicensed spectrum resource provided in this embodiment of the present disclosure, first, configuration of an unlicensed-spectrum serving cell is completed by receiving a configuration message; then, data is transmitted over the unlicensed-spectrum serving cell by using a received scheduling command. In this way, an unlicensed spectrum resource can be effectively used, thereby meeting a bandwidth requirement of an LTE device.

To make persons skilled in the art better understand the technical solutions provided in the embodiments of the present disclosure, the following provides an embodiment with a more detailed solution.

Figure 3:
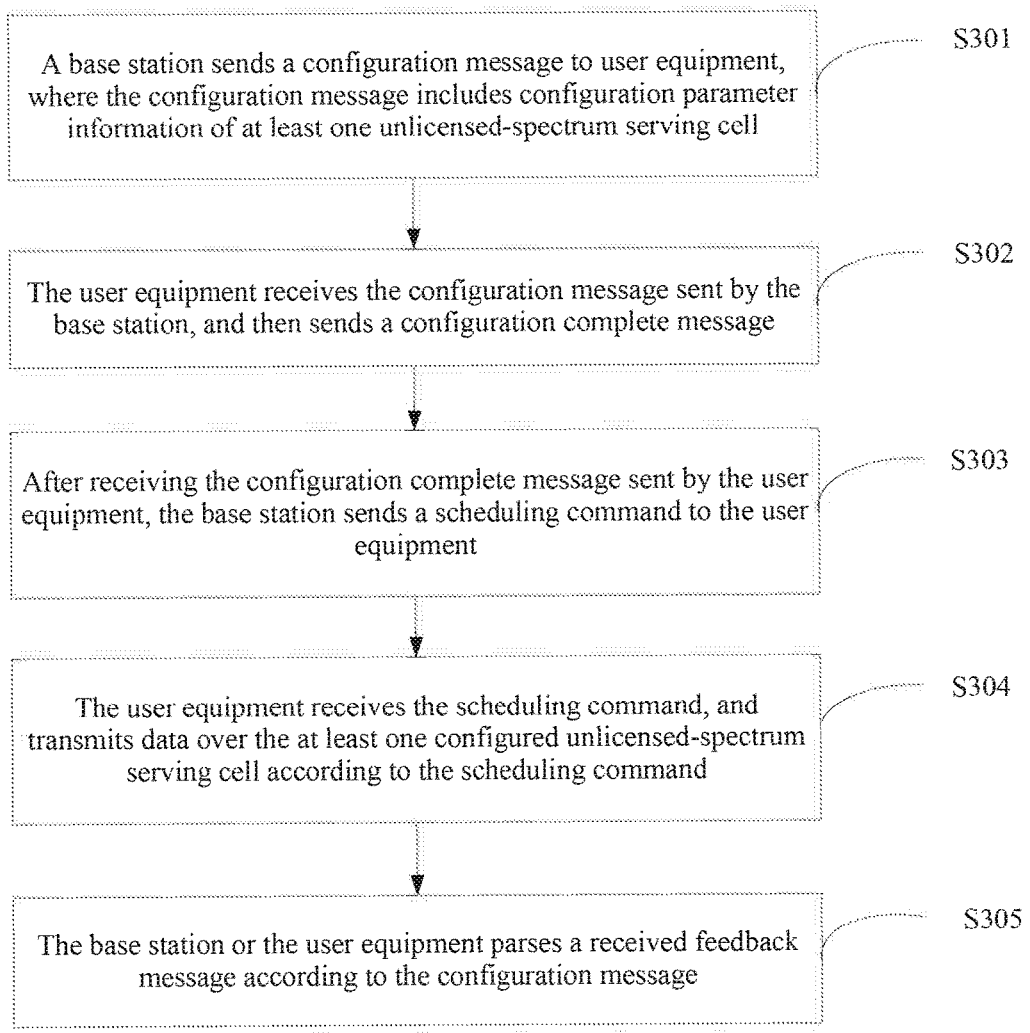
FIG. 3 is another schematic flowchart of a data scheduling method using an unlicensed spectrum resource according to an embodiment of the present disclosure.

The present disclosure provides a data scheduling method using an unlicensed spectrum resource. As shown in FIG. 3, the method is applicable to an LTE technology, and the method includes:

S301. A base station sends a configuration message to user equipment, where the configuration message includes configuration parameter information of at least one unlicensed-spectrum serving cell.

Specifically, this step may be implemented by using the following method:

The base station may configure at least one unlicensed-spectrum serving cell for the user equipment (UE), and use the unlicensed-spectrum serving cell as a secondary serving cell used during carrier aggregation, where:

the base station first sends the configuration message of the unlicensed-spectrum serving cell to the UE, where the configuration message may be a radio resource control (RRC) message or a system broadcast message, and the configuration message includes the configuration parameter information of the unlicensed-spectrum serving cell, where the parameter information may include a center frequency of the unlicensed-spectrum serving cell, that is, a center frequency of the unlicensed-spectrum serving cell carrier.

The foregoing parameter information may further include a bandwidth of the unlicensed-spectrum serving cell. The bandwidth may be represented by a physical resource block (PRB) or hertz, or may further be represented by a bandwidth index value. The bandwidth index value is a one-to-one correspondence with a value of the bandwidth, and the correspondence may be preconfigured.

The foregoing parameter information may further include a cell identity of the unlicensed-spectrum serving cell. The cell identity may be a physical-layer cell identifier (PCI), or a E-UTRAN cell global identifier (ECGI).

Figure 4:
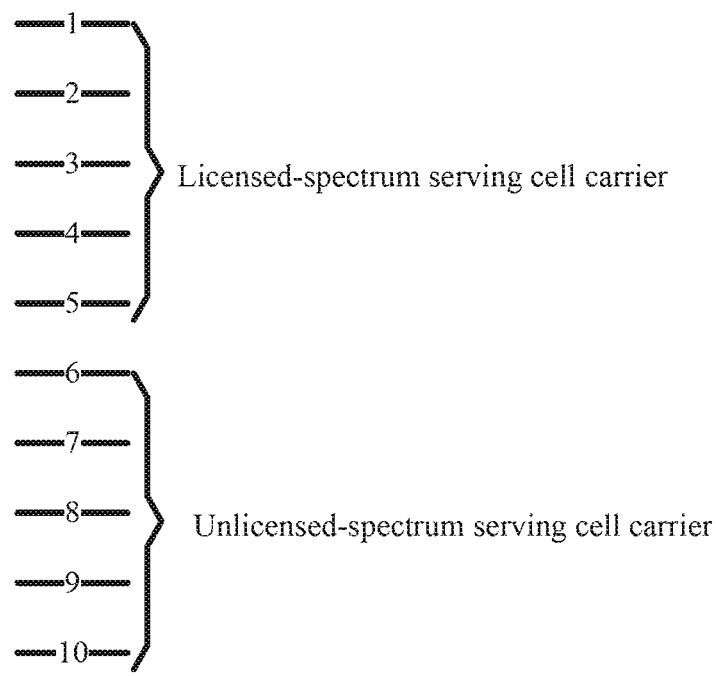
FIG. 4 is a schematic diagram of a cell index numbering scenario according to an embodiment of the present disclosure.

The foregoing parameter information may further include a cell index of the unlicensed-spectrum serving cell. The cell index may be a sequence number corresponding to the unlicensed-spectrum serving cell. A rule for formulating the sequence number may be as follows: In a coverage area of the base station, all licensed-spectrum serving cells and/or unlicensed-spectrum serving cells that may be configured for the UE are numbered by considering all the serving cells. Exemplarily, as shown in FIG. 4, a horizontal line denotes a cell carrier, and a number on the horizontal line denotes a sequence number corresponding to the carrier. If five licensed-spectrum serving cells and five unlicensed-spectrum serving cells are found by means of searching in the coverage area of the base station, and if the cells found by means of searching are numbered by considering all the cells, all the cells may be numbered using integers starting from 1 in ascending manner.

Figure 5:
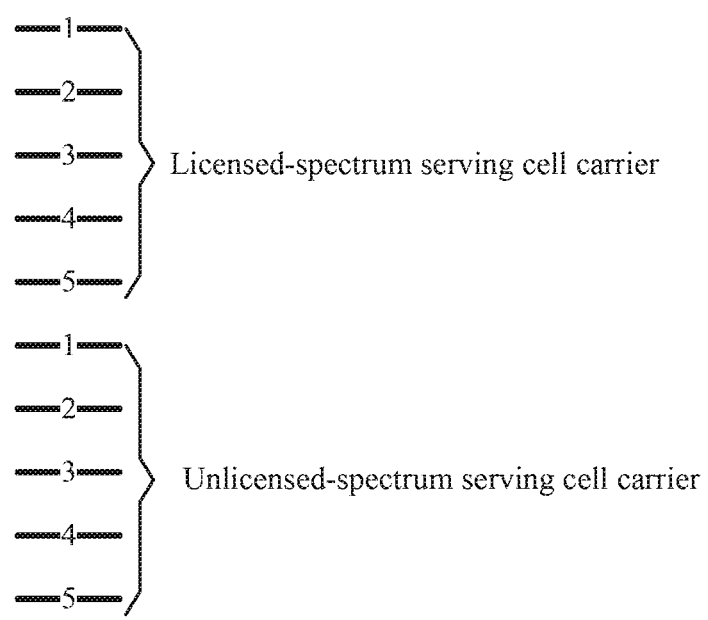
FIG. 5 is another schematic diagram of a cell index numbering scenario according to an embodiment of the present disclosure.
Figure 6:
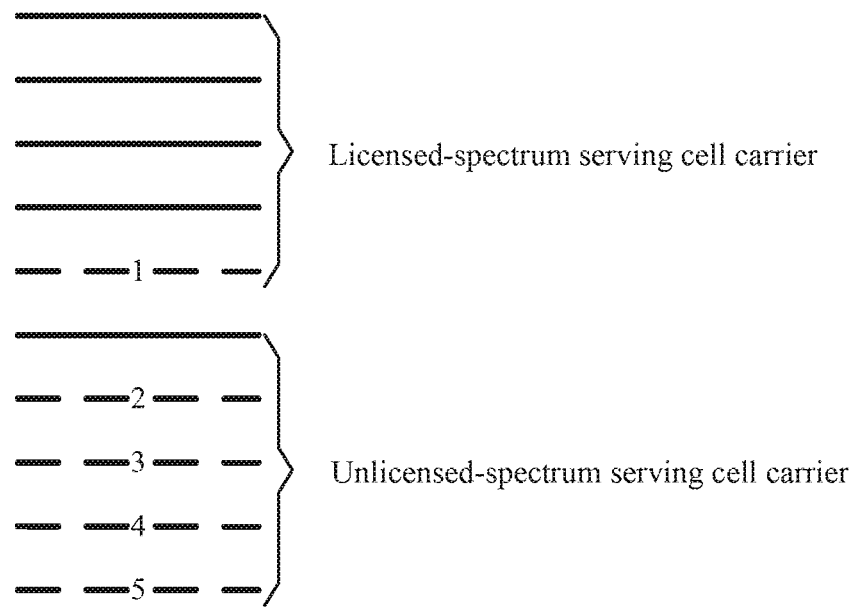
FIG. 6 is another schematic diagram of a cell index numbering scenario according to an embodiment of the present disclosure.

Alternatively, the cells found by means of searching may be separately numbered. That is, the licensed-spectrum serving cells and the unlicensed-spectrum serving cells found means of searching are separately numbered according to a specific numbering rule. Therefore, a case in which a sequence number of a licensed-spectrum serving cell and a sequence number of an unlicensed-spectrum serving cell are the same may occur. Exemplarily, as shown in FIG. 5, a horizontal line denotes a cell carrier, and a number on the horizontal line denotes a sequence number corresponding to the carrier. The cell index may be configured only when cross-scheduling needs to be performed between the licensed-spectrum serving cells and the unlicensed-spectrum serving cells. That is, when cross-scheduling does not to be performed between the licensed-spectrum serving cells and the unlicensed-spectrum serving cells, the sequence number is set to be a null value. If an unlicensed-spectrum serving cell calls only the unlicensed-spectrum serving cell itself, a cell index may not be configured for the unlicensed-spectrum serving cell. As shown in FIG. 6, a dotted line denotes a carrier that needs to be cross-scheduled during carrier aggregation, a horizontal line denotes a cell carrier, and a number on the horizontal line denotes a sequence number corresponding to the carrier.

It should be further noted that when the cells found by means of searching are separately numbered or the unlicensed-spectrum serving cell schedules a carrier only in the cell itself, when cross-scheduling at a carrier aggregation stage is implemented, a size of an existing carrier indicator field (CIF) does not need to be changed. The carrier indicator field is used to differentiate between different carriers, and the size of the existing CIF is generally 3 bits, which can meet cross-scheduling of eight different carriers.

In addition, if the cells found by means of searching are separately numbered, when cross-scheduling needs to be performed between a licensed-spectrum serving cell carrier and an unlicensed-spectrum serving cell carrier that have a same sequence number, the two carriers cannot be differentiated. In this case, an unlicensed-cell radio network temporary identifier (U-CRNTI) may be introduced, so as to mask a scheduling command when the unlicensed-spectrum serving cell carrier is scheduled, thereby differentiating between the licensed-spectrum serving cell carrier and the unlicensed-spectrum serving cell carrier that have the same sequence number without requiring to increase the size of the CIF field. Exemplarily, as shown in FIG. 5, if a licensed-spectrum serving cell carrier and an unlicensed-spectrum serving cell carrier that have a same sequence number 1 need to be cross-scheduled at the carrier aggregation stage, the U-CRNTI is used to mask the scheduling command when the unlicensed-spectrum serving cell carrier 1 is scheduled, to indicate that the carrier 1 belongs to the unlicensed-spectrum serving cell. That is, the licensed-spectrum serving cell carrier 1 and the unlicensed-spectrum serving cell carrier 1 can be differentiated.

The foregoing parameter information may further include a data transfer mode used by the unlicensed-spectrum serving cell, where the transmission mode includes a full-duplex or half-duplex mode. In the full-duplex mode, an uplink data transfer mode and a downlink data transfer mode can both be TDD or FDD; or the data transfer mode is defined as follows: only uplink data transfer uses FDD or only downlink data transfer uses FDD. The half-duplex mode includes a half-duplex FDD mode.

It should be noted that, in the applied TDD mode, seven types of uplink-downlink timeslot configuration can be supported. That is, when 5 ms is used as a TDD data cycle, a ratio of a quantity of timeslots occupied by downlink data to a quantity of timeslots occupied by uplink data may be 2:3, 3:2, or 4:1; or when 10 ms is used as a TDD data cycle, a ratio of a quantity of timeslots occupied by downlink data to a quantity of timeslots occupied by uplink data may be 7:3, 8:2, 9:1, or 5:5.

The foregoing parameter information may further include a cross-scheduling state identifier used by the unlicensed-spectrum serving cell. The state identifier is used to indicate whether the unlicensed-spectrum serving cell supports a mode of cross-scheduling different cell carriers. The state identifier may be indicated as cross-scheduling mode being always used or cross-scheduling mode being never used, and the state identifier may be preconfigured in a data transfer protocol.

It should be noted that, when the cross-scheduling state identifier indicates that the mode of cross-scheduling different cell carriers is supported, the foregoing parameter information may further include a cell identity or a cell index of a first cell. The first cell may be an unlicensed-spectrum serving cell or a licensed-spectrum serving cell, and the first cell can schedule a current unlicensed-spectrum serving cell.

The foregoing parameter information may further include a data transfer granularity corresponding to data transfer. In a frequency domain, a quantity of physical resource blocks (PRB) is used as the data transfer granularity, and a quantity of PRBs scheduled each time is an integral multiple of a quantity of PRBs included in a resource block group (RBG), where the RBG includes at least one PRB, and a different data transfer granularity is correspondingly assigned according to the bandwidth of the unlicensed-spectrum serving cell. That is, when the bandwidth of the unlicensed-spectrum serving cell is within a numerical value range, for example, when the bandwidth of the unlicensed-spectrum serving cell may be greater than or equal to 100 PRBs and less than or equal to 180 PRBs, a size of the RBG may be 5; or when the bandwidth of the unlicensed-spectrum serving cell is greater than or equal to 180 PRBs and less than or equal to 250 PRBs, a size of the RBG may be 6; or when the bandwidth of the unlicensed-spectrum serving cell exceeds a specific numerical value (for example, 300 PRBs, or a quantity of all PRBs included in the entire bandwidth), a size of the RBG may be set to a fixed value 10 or the bandwidth of the entire unlicensed-spectrum serving cell.

It should be noted that, when the bandwidth of the unlicensed-spectrum serving cell is not an integral multiple of the RBG, there is one RBG that includes a quantity of PRBs less than a quantity of PRBs included in another RBG.

In a time domain, a quantity of orthogonal frequency division multiplexing (OFDM) symbols is used as the data transfer granularity, and a quantity of orthogonal frequency division multiplexing symbols scheduled each time is an integral multiple of a quantity of orthogonal frequency division multiplexing symbols included in an orthogonal frequency division multiplexing group (OFDM Group), where the orthogonal frequency division multiplexing group includes at least one orthogonal frequency division multiplexing symbol. Exemplarily, if one OFDM Group includes one OFDM symbol, the data transfer granularity in the time domain is an integral multiple of one OFDM symbol; or if one OFDM Group includes two OFDM symbols, the data transfer granularity in the time domain is an integral multiple of two OFDM symbols.

It should be noted that, if a quantity of OFDM symbols included by the unlicensed-spectrum serving cell in one transmission time interval (TTI) is not an integral multiple of the OFDM Group, there may be one OFDM Group that includes a quantity of OFDM symbols less than a quantity of OFDM symbols included in another OFDM Group.

The data transfer granularity may be preconfigured in a data transfer protocol before data transfer.

The foregoing parameter information may further include a feedback parameter of a data feedback message, where the feedback parameter may include a start position and an end position of a scheduled OFDM symbol of the unlicensed-spectrum serving cell and/or a start position and an end position of a scheduled PRB of the unlicensed-spectrum serving cell, or positions of the first N OFDM symbols and/or positions of the former N PRBs, which are used to locate a position of feedback data in the foregoing feedback message, where N is a positive integer.

The foregoing feedback parameter may be preconfigured in the data transfer protocol before the feedback message is transmitted.

S302. The user equipment receives the configuration message sent by the base station, and then sends a configuration complete message.

Specifically, this step may be implemented by using the following method:

After receiving the configuration message sent by the base station, the user equipment completes configuration of the corresponding at least one unlicensed-spectrum serving cell according to the configuration parameter information included in the configuration message, uses the at least one unlicensed-spectrum serving cell as the secondary serving cell used at the carrier aggregation stage, and then sends the configuration complete message.

S303. After receiving the configuration complete message sent by the user equipment, the base station sends a scheduling command to the user equipment.

Specifically, this step may be implemented by using the following method:

After receiving the configuration complete message sent by the UE, the base station sends the scheduling command to the UE, to instruct the UE to transmit data over the cell corresponding to the configuration message. The scheduling command may be an uplink grant message or a downlink assignment message, where the uplink grant message is used to instruct the UE to send uplink data, and the downlink assignment message is used to instruct the UE to receive downlink data.

It should be noted that, the scheduling command may be sent over a cell configured by using configuration information, where the cell configured by using the configuration information may schedule at least one unlicensed-spectrum serving cell. Exemplarily, if in the configuration message, a primary licensed-spectrum serving cell, a secondary licensed-spectrum serving cell, or a secondary unlicensed-spectrum serving cell is configured to schedule an unlicensed-spectrum serving cell, the UE may receive the scheduling command over the primary licensed-spectrum serving cell, the secondary licensed-spectrum serving cell, or the secondary unlicensed-spectrum serving cell, and send uplink data or receive downlink data according to the scheduling command.

In addition, the scheduling command may be masked by using a cell-radio network temporary identifier (C-RNTI) or a U-CRNTI, which is used to differentiate between different UEs.

S304. The user equipment receives the scheduling command, and transmits data over the at least one configured unlicensed-spectrum serving cell according to the scheduling command.

Specifically, this step may be implemented by using the following method:

If the UE receives downlink data according to the scheduling command, the UE feeds back a downlink data receiving status to the base station over the at least one configured unlicensed-spectrum serving cell, that is, sends a feedback message corresponding to the downlink data to the base station; in the feedback message, feedback information is a one-to-one correspondence with the data, where the correspondence is determined according to a feedback parameter in the configuration information, that is, for feedback information at each position, one piece of data is corresponding to the feedback information at this position, where the feedback information is used to feed back a data receiving status at this position, and the data receiving status may be whether the data corresponding to this position is successfully received.

Alternatively, if the UE sends uplink data according to the scheduling command, after sending the uplink data, the UE receives a feedback message that is corresponding to the uplink data and that is sent from the base station; in the feedback message, feedback information is in a one-to-one correspondence with the data, where the correspondence is determined according to a feedback parameter in the configuration information, that is, for feedback information at each position, one piece of data is corresponding to the feedback information at this position, where the feedback information is used to feed back a data receiving status at this position, and the data receiving status may be whether the data corresponding to this position is successfully received.

It should be noted that, the feedback message may be sent or received over a primary spectrum serving cell, a licensed-spectrum serving cell, or an unlicensed-spectrum serving cell.

S305. The base station or the user equipment parses a received feedback message according to the configuration message.

Specifically, this step may be implemented by using the following method:

After receiving the feedback message, the user equipment or the base station may determine the position of the feedback data in the feedback message according to the feedback parameter that is corresponding to the feedback message and that is in the configuration information, that is, may determine the position of the feedback data in the feedback message by using a position of an OFDM symbol in the time domain or by using a position of a PRB in the frequency domain, thereby parsing out the feedback information corresponding to the data and determining whether the data is successfully received.

According to the data scheduling method using an unlicensed spectrum resource provided in this embodiment of the present disclosure, first, a base station configures an unlicensed-spectrum serving cell for user equipment by using configuration information of the unlicensed-spectrum serving cell; then, the base station and the user equipment transmit data over the unlicensed-spectrum serving cell by using a scheduling command. In this way, an unlicensed spectrum resource can be effectively used, thereby meeting a bandwidth requirement of an LTE device.

In addition, an embodiment of the present disclosure further provides a method for receiving a paging message. The method specifically includes:

S401. User equipment receives a configuration parameter of a dynamic uplink-downlink configuration function, where the configuration parameter is used to instruct the UE to execute the dynamic uplink-downlink configuration function.

Specifically, the configuration parameter of the dynamic uplink-downlink configuration function includes parameters such as an identifier used to mask a dynamic uplink-downlink configuration change command, a dynamic uplink-downlink configuration change cycle, and a reference downlink configuration. The configuration parameter is generally configured by using an RRC message.

S402. The user equipment attempts to receive a paging message in another subframe except a paging moment of the user equipment.

Exemplarily, assuming that the UE determines, with reference to a network-side configuration parameter and with reference to an identifier of the UE, that the paging moment of the UE is subframe 6 of radio frame 0, subframe 6 of radio frame 16, and so on, that is, a cycle is 16 radio frames, namely, 160 ms, and also determines that a possible paging moment of a network is subframes 0, 1, 5, and 6 of each radio frame, the UE may attempt to receive the paging message in another subframe, such as subframes 0, 1, and 5 of radio frame 0 and/or subframes 0, 1, 5, and 6 of radio frame 1, except the paging moment of the UE, such as subframe 6 of radio frame 0 and subframe 6 of radio frame 16. Optionally, the another subframe described herein is in a same system message change cycle as the paging moment, determined by the UE, of the UE.

When the paging moment of the user equipment changes from a special subframe to a downlink subframe, the user equipment does not receive the paging message at the paging moment of the user equipment;

and/or when the another subframe changes from a special subframe to a downlink subframe, the user equipment does not receive the paging message in the another subframe.

The paging moment of the user equipment may be subframe 6 or may be another subframe. Optionally, the subframe may be a moment, for the user equipment to receive the paging message, determined by the UE according to the network-side configuration parameter, such as a paging cycle, with reference to the identifier of the UE. Alternatively, the subframe may be a possible paging moment, of the network, determined according to the network-side configuration parameter, and is not necessarily the paging moment of the user equipment.

Exemplarily, assuming that the UE determines, with reference to a network-side configuration parameter and with reference to an identifier of the UE, that the paging moment of the UE is subframe 6 of radio frame 0, subframe 6 of radio frame 16, and so on, that is, a cycle is 16 radio frames, namely, 160 ms, and also determines that a possible paging moment of a network is subframes 0, 1, 5, and 6 of each radio frame, when subframe 6 of radio frame 0 in an uplink-downlink configuration in a physical-layer signaling notification received by the UE changes from a special subframe to a downlink subframe, the UE does not receive the paging message in subframe 6 of radio frame 0, or the UE attempts to receive the paging message in another subframe, such as subframe 0, and/or subframe 1, and/or subframe 5, and/or at a possible paging moment in another radio frame in addition to this subframe.

Exemplarily, assuming that the UE determines, with reference to a network-side configuration parameter and with reference to an identifier of the UE, that the paging moment of the UE is subframe 6 of radio frame 0, subframe 6 of radio frame 16, and so on, that is, a cycle is 16 radio frames, namely, 160 ms, and also determines that a possible paging moment of a network is subframes 0, 1, 5, and 6 of each radio frame, when subframe 6 of radio frame 1 in an uplink-downlink configuration in a physical-layer signaling notification received by the UE changes from a special subframe to a downlink subframe, the UE does not receive the paging message in subframe 6 of radio frame 1.

The UE receives at least N paging messages in a system message change cycle, where N is a natural number, and N may be configured by a system, for example, configured in a broadcast message, or may be fixed in a protocol.

Before the user equipment attempts to receive the paging message in the another subframe except the paging moment of the user equipment, the method further includes: receiving, by the user equipment, a notification message, where the notification message is used to instruct the user equipment to attempt to receive the paging message in the another subframe except the paging moment of the user equipment, and the notification message may be an RRC message, or a system broadcast message, or be fixed in a protocol, which is not limited in the present disclosure.

For UE in a connected state, a major function of the paging message is to indicate a system message change, and a system message change notification is included in the paging message sent at each possible paging moment, including the paging message sent at a paging moment of the UE and also including the paging message sent at a paging moment of another UE. Therefore, the UE can also achieve a purpose of receiving the system message change notification by receiving the paging message at the paging moment of the another UE.

In addition, it should be noted that, in an existing LTE or LTE-A system, a paging message (Paging) has at least two functions. One function is that: A network side such as a base station notifies, by means of Paging, user equipment (UE) that there is a mobile terminated service, and this function may be intended for UE in an idle state.

The other function is that: The network side such as the base station notifies, by means of Paging, the UE that a system broadcast message is changed, and this function may be intended for the UE in the idle state and the UE in the connected state.

The UE determines, according to a paging related parameter, such as a paging cycle, configured by the network side, such as the base station, and with reference to the identifier of the UE, a moment when the UE receives the paging message, for example, determines radio subframes of some radio frames.

In a time division duplex (TDD) system, according to a network-side configuration, a possible paging moment may include subframes 0, 1, 5, and 6 of a radio frame. That is, a paging message may be transmitted in these subframes.

In an existing TDD LTE or LTE-A system, there are a total of seven types of uplink-downlink configurations. In each type of uplink-downlink configuration, a quantity of uplink subframes and a quantity of downlink subframes in each radio frame are different, to adapt to different service characteristics. For example, when a downlink services volume is larger, a configuration with more downlink subframes is used; when an uplink service volume is larger, a configuration with more uplink subframes is used.

In addition, there is one or two special subframes. For example, in uplink-downlink configuration 0, subframes 0 to 9 in each radio frame are respectively as follows: uplink subframe, special subframe, uplink subframe, uplink subframe, uplink subframe, downlink subframe, special subframe, uplink subframe, uplink subframe, and uplink subframe.

In an uplink-downlink configuration 5, subframes 0 to 9 in each radio frame are respectively as follows: downlink subframe, special subframe, uplink subframe, downlink subframe, downlink subframe, downlink subframe, downlink subframe, downlink subframe, downlink subframe, and downlink subframe.

To adapt to changes of a service volume more dynamically, the dynamic uplink-downlink configuration function is introduced. A physical-layer signaling notification may be used, and an uplink-downlink configuration may be rapidly changed. For example, a change cycle may be one radio frame, namely, 10 ms, two radio frames, namely, 20 ms, or the like. A change principle may be as follows: One uplink-downlink configuration is indicated in a system message, where in the uplink-downlink configuration, an uplink subframe and a special subframe may be changed to downlink subframes, but a downlink subframe and a special subframe cannot be changed to uplink subframes.

Exemplarily, the uplink-downlink configuration indicated in the system message is uplink-downlink configuration 0, which may be dynamically changed to uplink-downlink configuration 5 by using a physical-layer signaling notification. In this case, subframes 3, 4, 8, and 9 are changed from uplink subframes to downlink subframes, and subframe 6 is changed from a special subframe to a downlink subframe. After receiving the physical-layer notification, the UE receives downlink data and/or sends uplink data according to the corresponding uplink and downlink subframes in uplink-downlink configuration 5, while conventional UE still receives downlink data and/or sends uplink data according to the uplink-downlink configuration in the system message.

A paging message is intended for all UEs in a current base station, including both the UE in the idle state and the UE in the connected state, and also including both UE that supports the dynamic uplink-downlink configuration function and has the dynamic uplink-downlink configuration function configured and conventional UE that does not support the dynamic uplink-downlink configuration function. Therefore, when the paging message needs to be sent in subframe 6, if subframe 6 is a special subframe in the uplink-downlink configuration of the system message, the paging message can be sent only in a special subframe manner for consideration of the conventional UE. The method for receiving a paging message provided in this embodiment of the present disclosure can prevent a problem of complex processing caused by simultaneously receiving, when a subframe dynamically changes from a special subframe to a downlink subframe, a paging message and data by UE with a dynamic uplink-downlink configuration function configured.

Figure 7:
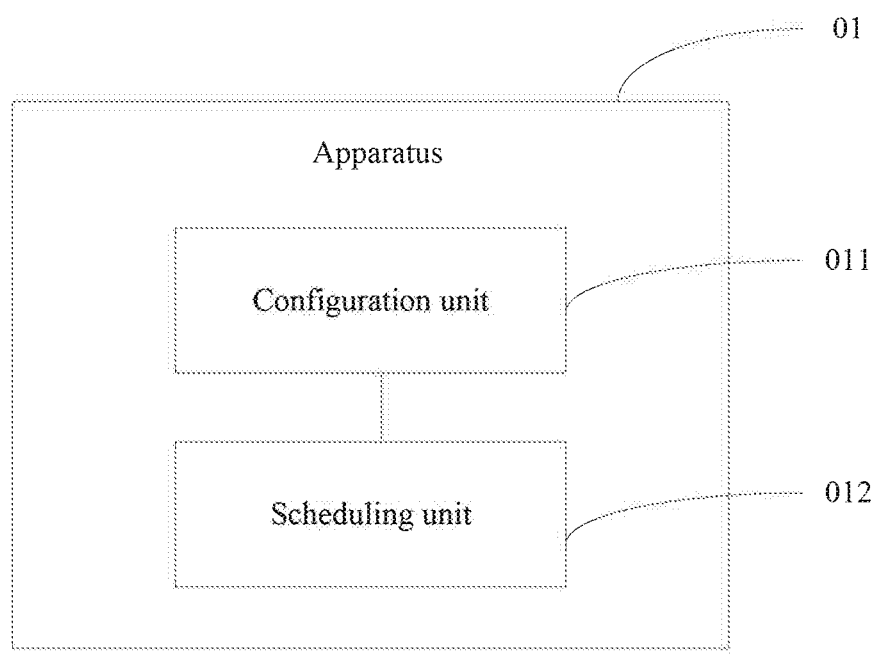
FIG. 7 is a schematic structural diagram of an apparatus according to an embodiment of the present disclosure.

An embodiment of the present disclosure provides an apparatus 01. As shown in FIG. 7, the apparatus includes:

a configuration unit 011, configured to send a configuration message, where the configuration message includes configuration parameter information of at least one unlicensed-spectrum serving cell; and a scheduling unit 012, configured to send a scheduling command according to the configuration parameter information sent by the configuration unit 011, so as to send data to or receive data from user equipment over the at least one unlicensed-spectrum serving cell, where the scheduling command is used for sending or receiving the service data.

Figure 8:
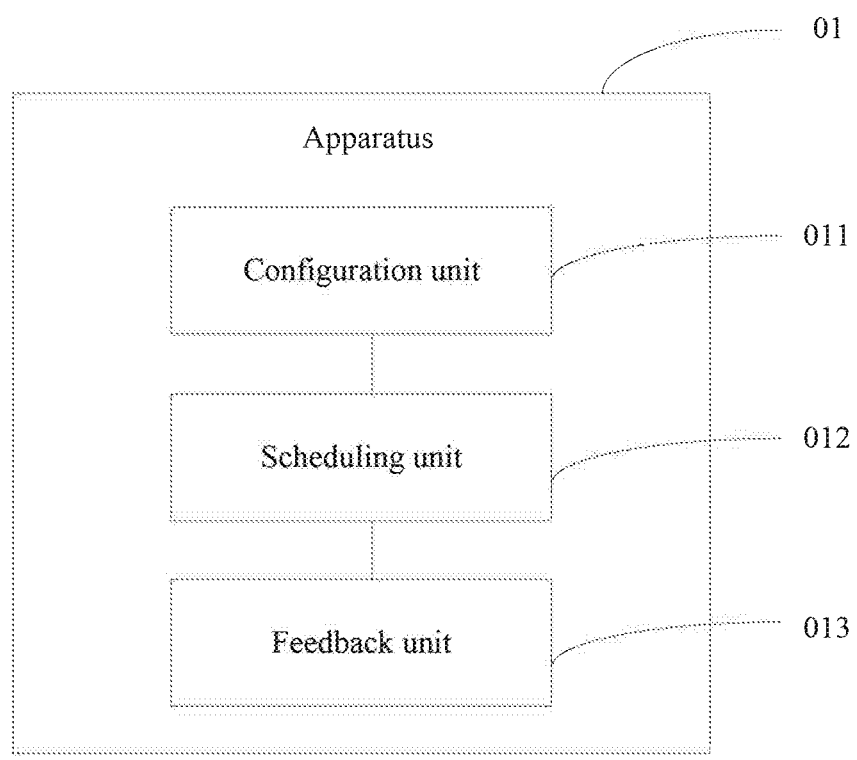
FIG. 8 is another schematic structural diagram of an apparatus according to an embodiment of the present disclosure.

Further, as shown in FIG. 8, the apparatus further includes:

a feedback unit 013, configured to receive or send a data feedback message corresponding to the data after the data is sent or received by using the scheduling unit 012.

Preferably, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

Preferably, the cell index of the unlicensed-spectrum serving cell includes:

a sequence number corresponding to the unlicensed-spectrum serving cell after a licensed-spectrum serving cell configured for the user equipment and/or an unlicensed-spectrum serving cell configured for the user equipment are/is numbered by considering all serving cells; or a sequence number corresponding to the unlicensed-spectrum serving cell after a licensed-spectrum serving cell configured for the user equipment and/or an unlicensed-spectrum serving cell configured for the user equipment are/is separately numbered; or when cross-scheduling does not need to be performed between the unlicensed-spectrum serving cell and the licensed serving cell, setting the cell index to null.

Figure 9:
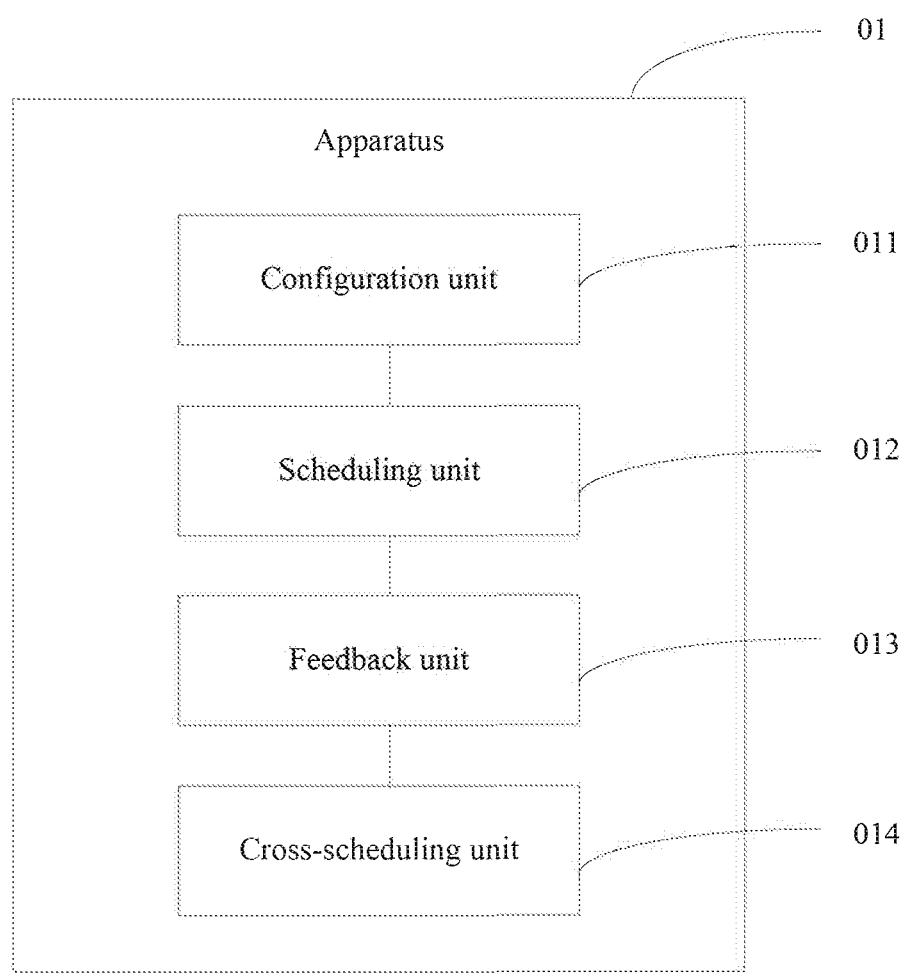
FIG. 9 is another schematic structural diagram of an apparatus according to an embodiment of the present disclosure.

Further, as shown in FIG. 9, the apparatus 01 further includes:

a cross-scheduling unit 014, configured to: when the licensed-spectrum serving cell configured for the user equipment and/or the unlicensed-spectrum serving cell configured for the user equipment are/is numbered by considering all serving cells, extend a length of a carrier indicator field, so that at least eight serving cells are cross-scheduled during carrier aggregation; or mask the scheduling command by using an unlicensed-cell radio network temporary identifier, so that at least eight serving cells are cross-scheduled during carrier aggregation, where the unlicensed-cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, differentiate between the licensed-spectrum serving cell and the unlicensed-spectrum serving cell by using the center frequency or signaling.

Preferably, the data transfer mode used by the unlicensed-spectrum serving cell includes:

a full-duplex mode and/or a half-duplex mode, where the full-duplex mode includes a frequency division multiplexing duplex mode or a time division multiplexing duplex mode, and the half-duplex mode includes a frequency division multiplexing half-duplex mode, or that only downlink data uses a frequency division multiplexing duplex mode, or that only uplink data uses a frequency division multiplexing duplex mode.

Preferably, the cross-scheduling state identifier used by the unlicensed-spectrum serving, cell includes:

an identifier of whether the unlicensed-spectrum serving cell is cross-scheduled by the licensed-spectrum serving cell, or an identifier corresponding to the licensed serving cell that cross-schedules the unlicensed serving cell.

Preferably, the data transfer granularity corresponding to the data transfer performed in the time domain or the frequency domain includes:

in the frequency domain, a quantity of physical resource blocks is used as the data transfer granularity, and a quantity of physical resource blocks scheduled each time is an integral multiple of a quantity of physical resource blocks included in a resource block group, where the resource block group includes at least one physical resource block, and a different data transfer granularity is correspondingly assigned according to the bandwidth of the unlicensed-spectrum serving cell; and/or in the time domain, a quantity of orthogonal frequency division multiplexing symbols is used as the data transfer granularity, and a quantity of orthogonal frequency division multiplexing symbols scheduled each time is an integral multiple of a quantity of orthogonal frequency division multiplexing symbols included in an orthogonal frequency division multiplexing group, where the orthogonal frequency division multiplexing group includes at least one orthogonal frequency division multiplexing symbol.

Preferably, the feedback parameter corresponding to the data feedback message includes:

using a start position or an end position of an orthogonal frequency division multiplexing symbol to determine a position of the data feedback message; or using a start position or an end position of an orthogonal frequency division multiplexing symbol, and a start position or an end position of a physical resource block to determine a position of the data feedback message, where the feedback parameter is preconfigured in a data transfer protocol before data is transmitted between devices.

Further, the scheduling unit 012 is configured to:

when the unlicensed-spectrum serving cell is cross-scheduled, mask the scheduling command by using an unlicensed-cell radio network temporary identifier, and send the scheduling command.

Preferably, the configuration message is a configuration message corresponding to a secondary serving cell of a base station.

By using the apparatus provided in this embodiment of the present disclosure, first, an unlicensed-spectrum serving cell is configured for a user by sending configuration information; then, a scheduling command is sent, so that data is transmitted over the unlicensed-spectrum serving cell. In this way, an unlicensed spectrum resource can be effectively used, thereby meeting a bandwidth requirement of an LTE device.

Figure 10:
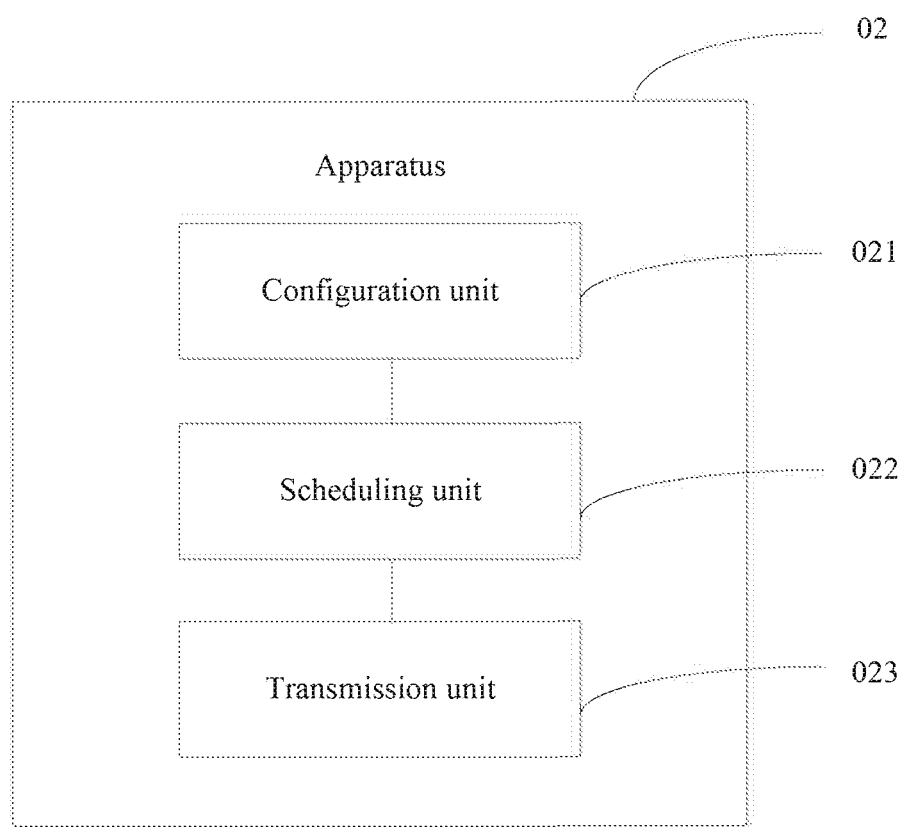
FIG. 10 is another schematic structural diagram of an apparatus according to an embodiment of the present disclosure.

An embodiment of the present disclosure provides an apparatus 02. As shown in FIG. 10, the apparatus 02 includes:

a configuration unit 021, configured to receive a configuration message, where the configuration message includes configuration parameter information of at least one unlicensed-spectrum serving cell;

a scheduling unit 022, configured to receive a scheduling command, where the scheduling command is used for sending or receiving data; and a transmission unit 023, configured to send or receive the data over the at least one unlicensed-spectrum serving cell according to the scheduling, command received by the scheduling unit 022.

Figure 11:
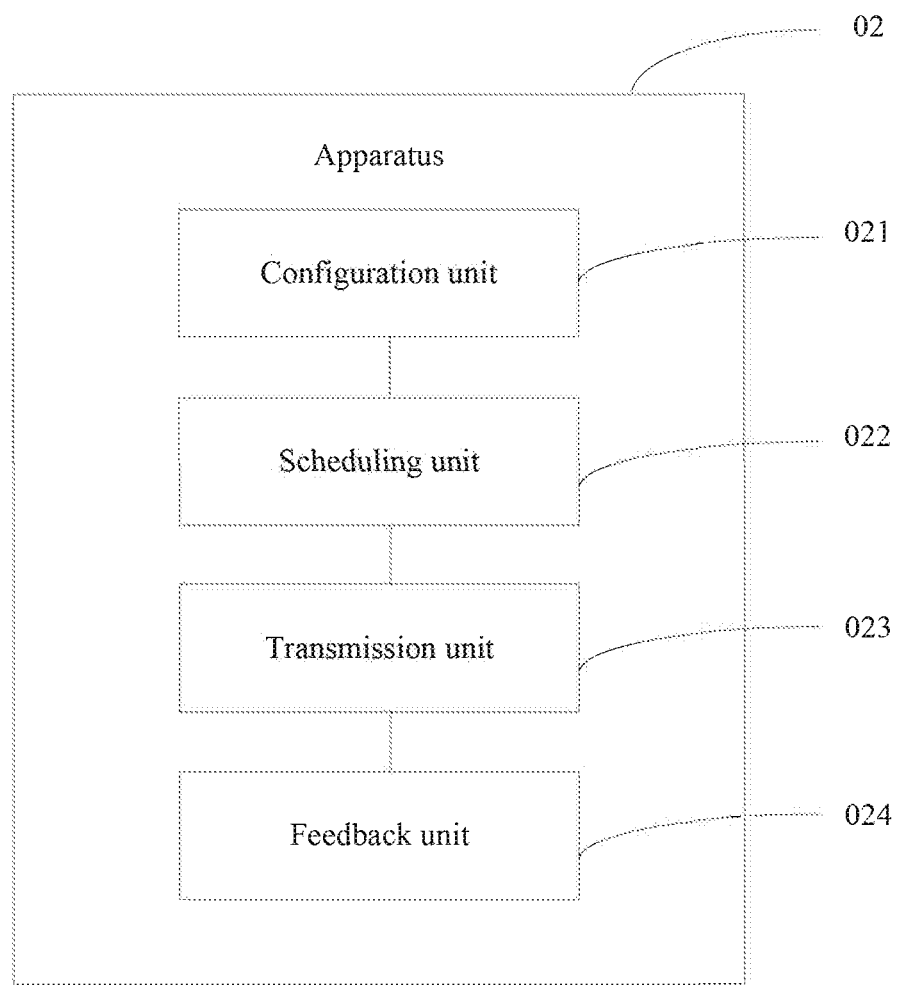
FIG. 11 is another schematic structural diagram of an apparatus according to an embodiment of the present disclosure.

Further, as shown in FIG. 11, the apparatus further includes:

a feedback unit 024, configured to receive or send a data feedback message corresponding to the data after the data is sent or received by the transmission unit 023.

Preferably, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a domain or a frequency domain; and a feedback parameter corresponding to the data.

Preferably, the cell index of the unlicensed-spectrum serving cell includes:

a sequence number corresponding to the unlicensed-spectrum serving cell after a licensed-spectrum serving cell configured for the user equipment and/or an unlicensed-spectrum serving cell configured for the user equipment are/is numbered by considering all serving cells; or a sequence number corresponding to the unlicensed-spectrum serving cell after a licensed-spectrum serving cell configured for the user equipment and/or an unlicensed-spectrum serving cell configured for the user equipment are/is separately numbered; or when cross-scheduling does not need to be performed between the unlicensed-spectrum serving cell and the licensed serving cell, setting the cell index to null.

Figure 12:
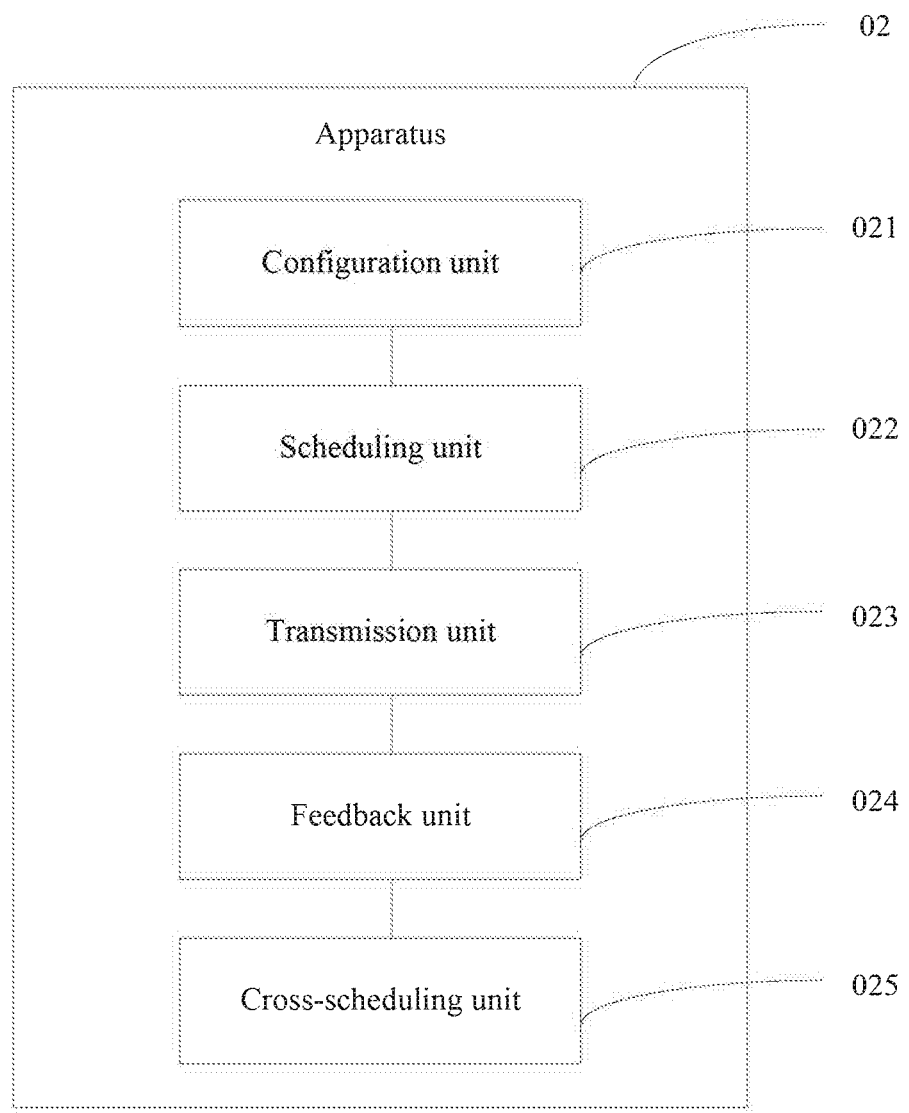
FIG. 12 is another schematic structural diagram of an apparatus according to an embodiment of the present disclosure.

Further, as shown in FIG. 12, the apparatus 02 further includes:

a cross-scheduling unit 025, configured to: when the licensed-spectrum serving cell configured for the user equipment and/or the unlicensed-spectrum serving cell configured for the user equipment are/is numbered by considering all serving cells, extend a length of a carrier indicator field, so that at least eight serving cells are cross-scheduled during carrier aggregation; or mask the scheduling command by using an unlicensed-cell radio network temporary identifier, so that at least eight serving cells are cross-scheduled during carrier aggregation, where the unlicensed-cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, differentiate between the licensed-spectrum serving cell and the unlicensed-spectrum serving cell by using the center frequency or signaling.

Preferably, the data transfer mode used by the unlicensed-spectrum serving cell includes:

a full-duplex mode and/or a half-duplex mode, where the full-duplex mode includes a frequency division multiplexing duplex mode or a time division multiplexing duplex mode, and the half-duplex mode includes a frequency division multiplexing half-duplex mode, or that only downlink data uses a frequency division multiplexing duplex mode, or that only uplink data uses a frequency division multiplexing duplex mode.

Preferably, the cross-scheduling state identifier used by the unlicensed-spectrum serving cell includes:

an identifier of whether the unlicensed-spectrum serving cell is cross-scheduled by the licensed-spectrum serving cell, or an identifier corresponding to the licensed serving cell that cross-schedules the unlicensed serving cell.

Preferably, the data transfer granularity corresponding to the data transfer performed in the time domain or the frequency domain includes:

in the frequency domain, a quantity of physical resource blocks is used as the data transfer granularity, and a quantity of physical resource blocks scheduled each time is an integral multiple of a quantity of physical resource blocks included in a resource block group, where the resource block group includes at least one physical resource block, and a different data transfer granularity is correspondingly assigned according to the bandwidth of the unlicensed-spectrum serving cell; and/or in the time domain, a quantity of orthogonal frequency division multiplexing symbols is used as the data transfer granularity, and a quantity of orthogonal frequency division multiplexing symbols scheduled each time is an integral multiple of a quantity of orthogonal frequency division multiplexing symbols included in an orthogonal frequency division multiplexing group, where the orthogonal frequency division multiplexing group includes at least one orthogonal frequency division multiplexing symbol.

Preferably, the feedback parameter corresponding to the data feedback message includes:

using a start position or an end position of an orthogonal frequency division multiplexing symbol to determine a position of the data feedback message; or using a start position or an end position of an orthogonal frequency division multiplexing symbol, and a start position or an end position of a physical resource block to determine a position of the data feedback message, where the feedback parameter is preconfigured in a data transfer protocol before data is transmitted between devices.

Preferably, when the unlicensed-spectrum serving cell is cross-scheduled, the scheduling command is masked by using an unlicensed-cell radio network temporary identifier.

By using the apparatus provided in this embodiment of the present disclosure, first, configuration of an unlicensed-spectrum serving cell is completed by receiving a configuration message; then, data is transmitted over the unlicensed-spectrum serving cell by using a received scheduling command. In this way, an unlicensed spectrum resource can be effectively used, thereby meeting a bandwidth requirement of an LTE device.

Preferably, the configuration message is a configuration message corresponding to a secondary serving cell of a base station.

Figure 13:
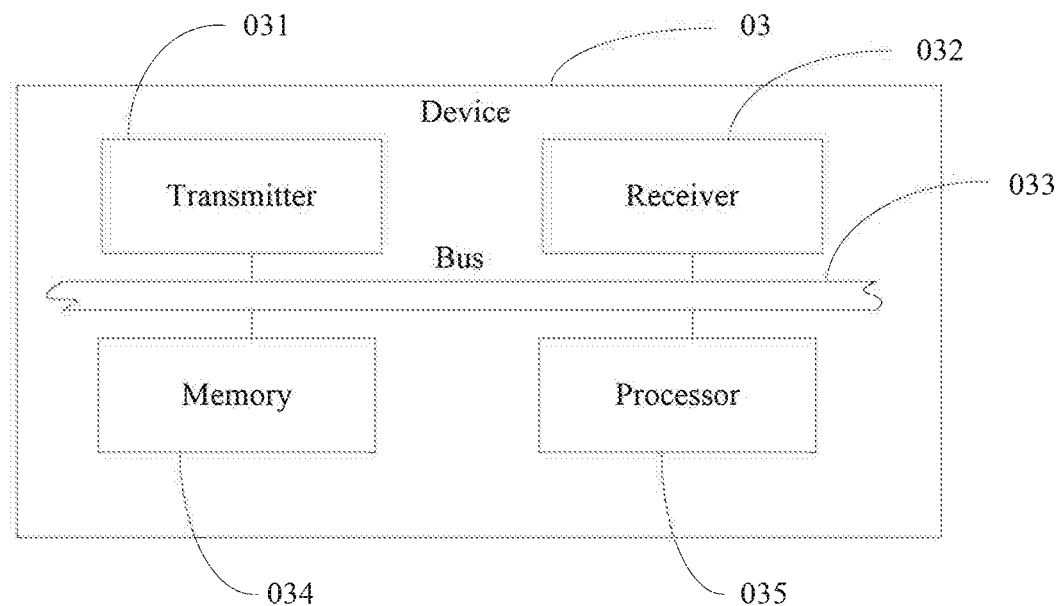
FIG. 13 is a schematic structural diagram of a device according to an embodiment of the present disclosure.

An embodiment of the present disclosure provides a device 03. As shown in FIG. 13, the device 03 includes a transmitter 031, a receiver 032, a bus 033, a memory 034, and a processor 035, where the memory 034 is configured to store an instruction, and the processor 035 reads the instruction to:

send a configuration message by using the transmitter 031, where the configuration message includes configuration parameter information of at least one unlicensed-spectrum serving cell; and send a scheduling command by using the transmitter 031 according to the configuration parameter information sent by the transmitter 031, so as to send data to or receive data from user equipment over the at least one unlicensed-spectrum serving cell, where the scheduling command is used for sending or receiving the data.

Further, the processor 035 reads the instruction to further:

receive, by using the receiver 032, or send, by using the transmitter 031, a data feedback message corresponding to the data.

Preferably, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

Preferably, the cell index of the unlicensed-spectrum serving cell includes:

a sequence number corresponding to the unlicensed-spectrum serving cell after a licensed-spectrum serving cell configured for the user equipment and/or an unlicensed-spectrum serving cell configured for the user equipment are/is numbered by considering all serving cells; or a sequence number corresponding to the unlicensed-spectrum serving cell after a licensed-spectrum serving cell configured for the user equipment and/or an unlicensed-spectrum serving cell configured for the user equipment are/is separately numbered; or when cross-scheduling does not need to be performed between the unlicensed-spectrum serving cell and the licensed serving cell, setting the cell index to null.

Further, the processor 035 reads the instruction to further:

when the licensed-spectrum serving cell configured for the user equipment and/or the unlicensed-spectrum serving cell configured for the user equipment are/is numbered by considering all serving cells, extend a length of a carrier indicator field, so that at least eight serving cells are cross-scheduled during carrier aggregation; or mask the scheduling command by using an unlicensed-cell radio network temporary identifier, so that at least eight serving cells are cross-scheduled during carrier aggregation, where the unlicensed-cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, differentiate between the licensed-spectrum serving cell and the unlicensed-spectrum serving cell by using the center frequency or signaling.

Preferably, the data transfer mode used by the unlicensed-spectrum serving cell includes:

a full-duplex mode and/or a half-duplex mode, where the full-duplex mode includes a frequency division multiplexing duplex mode or a time division multiplexing duplex mode, and the half-duplex mode includes a frequency division multiplexing half-duplex mode, or that only downlink data uses a frequency division multiplexing duplex mode, or that only uplink data uses a frequency division multiplexing duplex mode.

Preferably, the cross-scheduling state identifier used by the unlicensed-spectrum serving cell includes:

an identifier of whether the unlicensed-spectrum serving cell is cross-scheduled by the licensed-spectrum serving cell, or an identifier corresponding to the licensed serving cell that cross-schedules the unlicensed serving cell.

Preferably, the data transfer granularity corresponding to the data transfer performed in the time domain or the frequency domain includes:

in the frequency domain, a quantity of physical resource blocks is used as the data transfer granularity, and a quantity of physical resource blocks scheduled each time is an integral multiple of a quantity of physical resource blocks included in a resource block group, where the resource block group includes at least one physical resource block, and a different data transfer granularity is correspondingly assigned according to the bandwidth of the unlicensed-spectrum serving cell; and/or in the time domain, a quantity of orthogonal frequency division multiplexing symbols is used as the data transfer granularity, and a quantity of orthogonal frequency division multiplexing symbols scheduled each time is an integral multiple of a quantity of orthogonal frequency division multiplexing symbols included in an orthogonal frequency division multiplexing group, where the orthogonal frequency division multiplexing group includes at least one orthogonal frequency division multiplexing symbol.

Preferably, the feedback parameter corresponding to the data feedback message includes:

using a start position or an end position of an orthogonal frequency division multiplexing symbol to determine a position of the data feedback message; or using a start position or an end position of an orthogonal frequency division multiplexing symbol, and a start position or an end position of a physical resource block to determine a position of the data feedback message, where the feedback parameter is preconfigured in a data transfer protocol before data is transmitted between devices.

Further, the processor 035 reads the instruction to further:

when the unlicensed-spectrum serving cell is cross-scheduled, mask the scheduling command by using an unlicensed-cell radio network temporary identifier, and send the scheduling command.

Preferably, the configuration message is a configuration message corresponding to a secondary serving cell of a base station.

By using the device provided in this embodiment of the present disclosure, first, an unlicensed-spectrum serving cell is configured for a user by sending configuration information; then, a scheduling command is sent, so that data is transmitted over the unlicensed-spectrum serving cell. In this way, an unlicensed spectrum resource can be effectively used, thereby meeting a bandwidth requirement of an LTE device.

Figure 14:
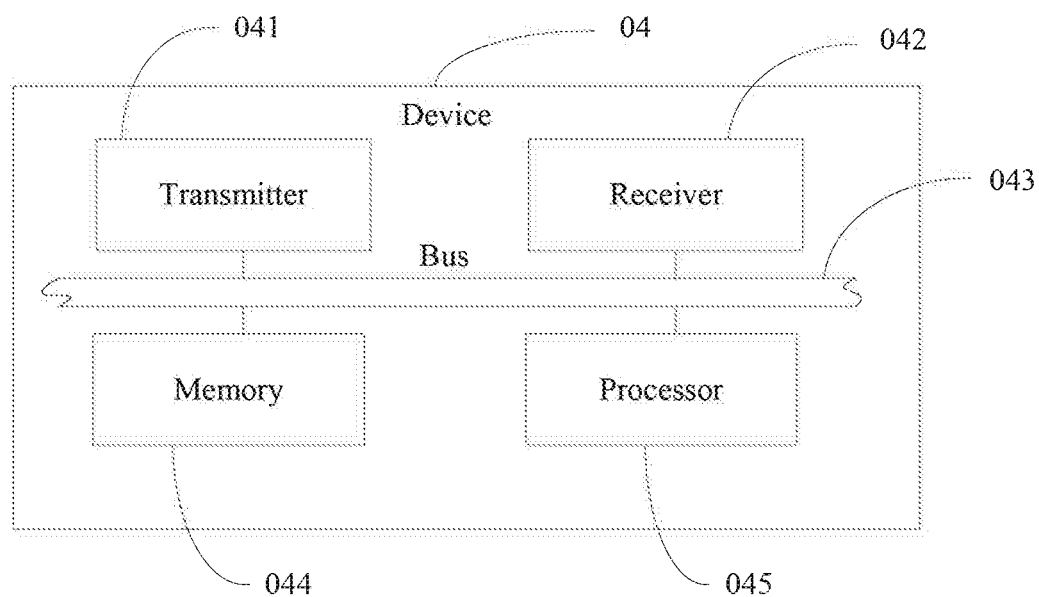
FIG. 14 is another schematic structural diagram of a device according to an embodiment of the present disclosure.

An embodiment of the present disclosure provides a device 04. As shown in FIG. 14, the device 04 includes a transmitter 041, a receiver 042, a bus 043, a memory 044, and a processor 045, where the memory 044 is configured to store an instruction, and the processor 045 reads the instruction to:

receive a configuration message by using the receiver 042, where the configuration message includes configuration parameter information of at least one unlicensed-spectrum serving cell;

receive a scheduling command by using the receiver 042, where the scheduling command is used for sending or receiving data; and send, by using the transmitter 041, or receive, by using the receiver 042, the data over the at least one unlicensed-spectrum serving cell according to the scheduling command received by the receiver 042.

Further, the processor 045 reads the instruction to further:

receive, by using the receiver 042, or send, by using the transmitter 041, a data feedback message corresponding to the data.

Preferably, the configuration parameter information includes at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

Preferably, the cell index of the unlicensed-spectrum serving cell includes:

a sequence number corresponding to the unlicensed-spectrum serving cell after a licensed-spectrum serving cell configured for the user equipment and/or an unlicensed-spectrum serving cell configured for the user equipment are/is numbered by considering all serving cells; or a sequence number corresponding to the unlicensed-spectrum serving cell after a licensed-spectrum serving cell configured for the user equipment and/or an unlicensed-spectrum serving cell configured for the user equipment are/is separately numbered; or when cross-scheduling does not need to be performed between the unlicensed-spectrum serving cell and the licensed serving cell, setting the cell index to null.

Further, the processor 045 reads the instruction to further:

when the licensed-spectrum serving cell configured for the user equipment and/or the unlicensed-spectrum serving cell configured for the user equipment are/is numbered by considering all serving cells, extend a length of a carrier indicator field, so that at least eight serving cells are cross-scheduled during carrier aggregation; or mask the scheduling command by using an unlicensed-cell radio network temporary identifier, so that at least eight serving cells are cross-scheduled during carrier aggregation, where the unlicensed-cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, differentiate between the licensed-spectrum serving cell and the unlicensed-spectrum serving cell by using the center frequency or signaling.

Preferably, the data transfer mode used by the unlicensed-spectrum serving cell includes:

a full-duplex mode and/or a half-duplex mode, where the full-duplex mode includes a frequency division multiplexing duplex mode or a time division multiplexing duplex mode, and the half-duplex mode includes a frequency division multiplexing half-duplex mode, or that only downlink data uses a frequency division multiplexing duplex mode, or that only uplink data uses a frequency division multiplexing duplex mode.

Preferably, the cross-scheduling state identifier used by the unlicensed-spectrum serving cell includes:

an identifier of whether the unlicensed-spectrum serving cell is cross-scheduled by the licensed-spectrum serving cell, or an identifier corresponding to the licensed serving cell that cross-schedules the unlicensed serving cell.

Preferably, the data transfer granularity corresponding to the data transfer performed in the time domain or the frequency domain includes:

in the frequency domain, a quantity of physical resource blocks is used as the data transfer granularity, and a quantity of physical resource blocks scheduled each time is an integral multiple of a quantity of physical resource blocks included in a resource block group, where the resource block group includes at least one physical resource block, and a different data transfer granularity is correspondingly assigned according to the bandwidth of the unlicensed-spectrum serving cell; and/or in the time domain, a quantity of orthogonal frequency division multiplexing symbols is used as the data transfer granularity, and a quantity of orthogonal frequency division multiplexing symbols scheduled each time is an integral multiple of a quantity of orthogonal frequency division multiplexing symbols included in an orthogonal frequency division multiplexing group, where the orthogonal frequency division multiplexing group includes at least one orthogonal frequency division multiplexing symbol.

Preferably, the feedback parameter corresponding to the data feedback message includes:

using a start position or an end position of an orthogonal frequency division multiplexing symbol to determine a position of the data feedback message; or using a start position or an end position of an orthogonal frequency division multiplexing symbol, and a start position or an end position of a physical resource block to determine a position of the data feedback message, where the feedback parameter is preconfigured in a data transfer protocol before data is transmitted between devices.

Preferably, when the unlicensed-spectrum serving cell is cross-scheduled, the scheduling command is masked by using an unlicensed-cell radio network temporary identifier.

Preferably, the configuration message is a configuration message corresponding to a secondary serving cell of a base station.

By using the device provided in this embodiment of the present disclosure, first, configuration of an unlicensed-spectrum serving cell is completed by receiving a configuration message; then, data is transmitted over the unlicensed-spectrum serving cell by using a received scheduling command. In this way, an unlicensed spectrum resource can be effectively used, thereby meeting a bandwidth requirement of an LTE device.

An embodiment of the present disclosure further provides user equipment, where the user equipment includes:

a receiving unit, where the receiving unit is configured to receive a configuration parameter of a dynamic uplink-downlink configuration function, where the configuration parameter is used to instruct the UE to execute the dynamic uplink-downlink configuration function; and a processing unit, where the processing unit is configured to attempt to receive a paging message in another subframe except a paging moment of the user equipment.

The processing unit further configured to:

When the paging moment of the user equipment changes from a special subframe to a downlink subframe, the user equipment does not receive the paging message at the paging moment of the user equipment;

and/or when the another subframe changes from a special subframe to a downlink subframe, the user equipment does not receive the paging message in the another subframe.

Preferably, the paging moment of the user equipment is subframe 6.

Preferably, the another subframe may be:

a new paging moment configured for the user equipment by a network side;

and/or all possible paging moments configured by a network side for other user equipment except the user equipment, where the possible paging moments do not include a paging moment, of the other user equipment, that is the same as the paging moment of the user equipment.

Preferably, the another subframe may be subframe 0, and/or subframe 1, and/or subframe 5, and/or subframe 6.

Before the user equipment attempts to receive the paging message in the another subframe except the paging moment of the user equipment, the user equipment further includes:

a receiving unit, configured to receive a notification message, where the notification message is used to instruct the user equipment to attempt to receive the paging message in the another subframe except the paging moment of the user equipment.

The user equipment provided in this embodiment of the present disclosure can prevent a problem of complex processing caused by simultaneously receiving, when a subframe dynamically changes from a special subframe to a downlink subframe, a paging message and data by UE with a dynamic uplink-downlink configuration function configured.

An embodiment of the present disclosure further provides a network device, where the network device includes:

a sending unit, where the sending unit is configured to send a configuration parameter of a dynamic uplink-downlink configuration function, where the configuration parameter is used to instruct UE to execute the dynamic uplink-downlink configuration function.

Preferably, the sending unit is configured to send a notification message to the user equipment, where the notification message is used to instruct the user equipment to attempt to receive a paging message in another subframe except a paging moment of the user equipment.

The network device provided in this embodiment of the present disclosure can prevent a problem of complex processing caused by simultaneously receiving, when a subframe dynamically changes from a special subframe to a downlink subframe, a paging message and data by UE with a dynamic uplink-downlink configuration function configured.

It is noted that the various units and components in the present disclosure can be implemented using any suitable technology. In an example, a unit can be implemented using circuitry, such as integrated circuit (IC). In another example, a unit can be implemented as a processing circuit executing software instructions.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data scheduling method using an unlicensed spectrum resource, comprising:

sending a configuration message, wherein the configuration message comprises configuration parameter information of at least one unlicensed-spectrum serving cell; and sending a scheduling command according to the configuration parameter information, so as to send data to or receive data from user equipment over the at least one unlicensed-spectrum serving cell, wherein the scheduling command is used for sending or receiving the data, wherein the configuration parameter information comprises a cell index of the unlicensed-spectrum serving cell, when a licensed-spectrum serving cell configured for the user equipment and/or the unlicensed-spectrum serving cell configured for the user equipment are/is numbered by considering all serving cells, the method further comprises:

extending a length of a carrier indicator field, so that at least eight serving cells are cross-scheduled during carrier aggregation; or masking the scheduling command by using an unlicensed-spectrum serving cell radio network temporary identifier, so that at least eight serving cells are cross-scheduled during carrier aggregation, wherein the unlicensed-spectrum serving cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, the method further comprises:

differentiating between the licensed-spectrum serving cell and the unlicensed-spectrum serving cell by using a center frequency or signaling.

2. The method according to claim 1, wherein the method further comprises:

receiving or sending a data feedback message corresponding to the data.

3. The method according to claim 1, wherein the configuration parameter information comprises at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

4. The method according to claim 1, wherein the configuration parameter information comprises a cell index of the unlicensed-spectrum serving cell, and the cell index of the unlicensed-spectrum serving cell comprises:

a sequence number corresponding to the unlicensed-spectrum serving cell after a licensed-spectrum serving cell configured for the user equipment and/or the unlicensed-spectrum serving cell configured for the user equipment are/is numbered by considering all serving cells; or the sequence number corresponding to the unlicensed-spectrum serving cell after the licensed-spectrum serving cell configured for the user equipment and/or the unlicensed-spectrum serving cell configured for the user equipment are/is separately numbered; or null value when cross-scheduling does not need to be performed between the unlicensed-spectrum serving cell and a licensed-spectrum serving cell.

5. A data scheduling method using an unlicensed spectrum resource, comprising:

receiving a configuration message, wherein the configuration message comprises configuration parameter information of at least one unlicensed-spectrum serving cell;

receiving a scheduling command, wherein the scheduling command is used for sending or receiving service data; and sending or receiving the data over the at least one unlicensed-spectrum serving cell according to the scheduling command, wherein the configuration parameter information comprises a cell index of the unlicensed-spectrum serving cell, when a licensed-spectrum serving cell configured for the user equipment and/or the unlicensed-spectrum serving cell configured for the user equipment are/is numbered by considering all serving cells, the method further comprises:

extending a length of a carrier indicator field, so that at least eight serving cells are cross-scheduled during carrier aggregation; or masking the scheduling command by using an unlicensed-spectrum serving cell radio network temporary identifier, so that at least eight serving cells are cross-scheduled during carrier aggregation, wherein the unlicensed-spectrum serving cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, the method further comprises:

differentiating between the licensed-spectrum serving cell and the unlicensed-spectrum serving cell by using a center frequency or signaling.

6. The method according to claim 5, wherein the method further comprises:

receiving or sending a data feedback message corresponding to the data.

7. The method according to claim 5, wherein the configuration parameter information comprises at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;

a data transfer granularity corresponding to data transfer performed in a time domain or a frequency domain; and a feedback parameter corresponding to the data.

8. The method according to claim 5, wherein the configuration parameter information comprises a cell index of the unlicensed-spectrum serving cell, and the cell index of the unlicensed-spectrum serving cell comprises:

a sequence number corresponding to the unlicensed-spectrum serving cell after a licensed-spectrum serving cell configured for the user equipment and/or the unlicensed-spectrum serving cell configured for the user equipment are/is numbered by considering all serving cells; or a sequence number corresponding to the unlicensed-spectrum serving cell after the licensed-spectrum serving cell configured for the user equipment and/or the unlicensed-spectrum serving cell configured for the user equipment are/is separately numbered; or null value when cross-scheduling does not need to be performed between the unlicensed-spectrum serving cell and a licensed-spectrum serving cell.

9. A device, wherein the device comprises a transmitter, a receiver, a bus, a memory, and a processor, wherein the memory is configured to store instructions, and the processor executes the instructions to:

send a configuration message by using the transmitter, wherein the configuration message comprises configuration parameter information of at least one unlicensed-spectrum serving cell; and send a scheduling command by using the transmitter according to the configuration parameter information sent by the transmitter, so as to send data to or receive data from user equipment over the at least one unlicensed-spectrum serving cell, wherein the scheduling command is used for sending or receiving the data, wherein the configuration parameter information comprises a cell index of the unlicensed-spectrum serving cell, when a licensed-spectrum serving cell configured for the user equipment and/or the unlicensed-spectrum serving cell configured for the user equipment are/is numbered by considering all serving cells, the processor executes the instructions to:

extend a length of a carrier indicator field, so that at least eight serving cells are cross-scheduled during carrier aggregation; or mask the scheduling command by using an unlicensed-spectrum serving cell radio network temporary identifier, so that at least eight serving cells are cross-scheduled during carrier aggregation, wherein the unlicensed-spectrum serving cell radio network temporary identifier is used to differentiate the unlicensed-spectrum serving cell; and when the licensed-spectrum serving cell configured for the user equipment and/or the unlicensed-spectrum serving cell configured for the user equipment are/is separately numbered, the processor executes the instructions to:

differentiate between the licensed-spectrum serving cell and the unlicensed-spectrum serving cell by using a center frequency or signaling.

10. The device according to claim 9, wherein the processor executes the instructions to further:

receive, by using the receiver, or send, by using the transmitter, a data feedback message corresponding to the data.

11. The device according to claim 9, wherein the configuration parameter information comprises at least one type of or a combination of the following information:

a center frequency of the unlicensed-spectrum serving cell;

a bandwidth of the unlicensed-spectrum serving cell;

a cell identity of the unlicensed-spectrum serving cell;

a cell index of the unlicensed-spectrum serving cell;

a data transfer mode used by the unlicensed-spectrum serving cell;

a cross-scheduling state identifier used by the unlicensed-spectrum serving cell;
a data transfer granularity corresponding to data transfer performed in a time domain or a frequency domain; and
a feedback parameter corresponding to the data.

12. The device according to claim 9, wherein the configuration parameter information comprises a cell index of the unlicensed-spectrum serving cell, the cell index of the unlicensed-spectrum serving cell comprises:
    a sequence number corresponding to the unlicensed-spectrum serving cell after a licensed-spectrum serving cell configured for the user equipment and/or the unlicensed-spectrum serving cell configured for the user equipment are/is numbered by considering all serving cells; or
    the sequence number corresponding to the unlicensed-spectrum serving cell after a licensed-spectrum serving cell configured for the user equipment and/or the unlicensed-spectrum serving cell configured for the user equipment are/is separately numbered; or
    null value when cross-scheduling does not need to be performed between the unlicensed-spectrum serving cell and a licensed-spectrum serving cell.

13. A device, wherein the device comprises a transmitter, a receiver, a bus, a memory, and a processor, wherein the memory is configured to store instructions, and the processor executes the instructions to:
    receive a configuration message by using the receiver, wherein the configuration message comprises configuration parameter information of at least one unlicensed-spectrum serving cell;
    receive a scheduling command by using the receiver, wherein the scheduling command is used for sending or receiving data; and
    send, by using the transmitter, or receive, by using the receiver, the data over the at least one unlicensed-spectrum serving cell according to the scheduling command received by the receiver,
    wherein the configuration parameter information comprises a cell index of the unlicensed-spectrum serving cell,
    when a licensed-spectrum serving cell configured for the user equipment and/or the unlicensed-spectrum serving cell configured for the user equipment are/is numbered by considering all serving cells, the processor executes the instructions to:
        extend a length of a carrier indicator field, so that at least eight serving cells are cross-scheduled during carrier aggregation; or
        mask the scheduling command by using an unlicensed-spectrum serving cell radio network temporary identifier, so that at least eight serving cells are cross-scheduled during carrier aggregation, wherein the unlicensed-spectrum serving cell radio network temporary identifier is used to differentiate the unlicensed-spectrum serving cell; and
    when the licensed-spectrum serving cell configured for the user equipment and/or the unlicensed-spectrum serving cell configured for the user equipment are/is separately numbered, the processor executes the instructions to:
        differentiate between the licensed-spectrum serving cell and the unlicensed-spectrum serving cell by using a center frequency or signaling.

14. The device according to claim 13, wherein the processor executes the instructions to further:
    receive, by using the receiver, or send, by using the transmitter, a data feedback message corresponding to the data.

15. The device according to claim 13, wherein the configuration parameter information comprises at least one type of or a combination of the following information:
    a center frequency of the unlicensed-spectrum serving cell;
    a bandwidth of the unlicensed-spectrum serving cell;
    a cell identity of the unlicensed-spectrum serving cell;
    a cell index of the unlicensed-spectrum serving cell;
    a data transfer mode used by the unlicensed-spectrum serving cell;
    a cross-scheduling state identifier used by the unlicensed-spectrum serving cell;
    a data transfer granularity corresponding to data transfer performed in a time domain or a frequency domain; and
    a feedback parameter corresponding to the data.

16. The device according to claim 13, wherein the configuration parameter information comprises a cell index of the unlicensed-spectrum serving cell, the cell index of the unlicensed-spectrum serving cell comprises:
    a sequence number corresponding to the unlicensed-spectrum serving cell after a licensed-spectrum serving cell configured for the user equipment and/or the unlicensed-spectrum serving cell configured for the user equipment are/is numbered by considering all serving cells; or
    the sequence number corresponding to the unlicensed-spectrum serving cell after the licensed-spectrum serving cell configured for the user equipment and/or the unlicensed-spectrum serving cell configured for the user equipment are/is separately numbered; or
    null value when cross-scheduling does not need to be performed between the unlicensed-spectrum serving cell and a licensed-spectrum serving cell.

* * * * *

UNITED STATES PATENT AND TRADEMARK OFFICE
CERTIFICATE OF CORRECTION

PATENT NO. : 10,057,912 B2
APPLICATION NO. : 15/271006
DATED : August 21, 2018
INVENTOR(S) : Wei Quan et al.

Page 1 of 1

It is certified that error appears in the above-identified patent and that said Letters Patent is hereby corrected as shown below:

In the Specification

Column 2, Line 4, change "performed in a domain or a frequency domain" to --performed in a time domain or a frequency domain--; and Column 2, Line 47, change "performed in a domain or a frequency domain" to --performed in a time domain or a frequency domain--.

Column 5, Line 28, change "performed in a domain or a frequency domain" to --performed in a time domain or a frequency domain--.

Column 15, Line 54, change "the unlicensed-spectrum serving, cell" to --the unlicensed-spectrum serving cell--.

Column 16, Line 53, change "according to the scheduling, command" to --according to the scheduling command--.

Column 17, Line 6, change "performed in a domain or a frequency domain" to --performed in a time domain or a frequency domain--.

Column 22, Line 46, change "The processing unit further configured" to --The processing unit is further configured--.

Signed and Sealed this
Eighteenth Day of June, 2019

Andrei Iancu
*Director of the United States Patent and Trademark Office*